United States Patent
Jha (10) Patent No.: US 7,843,922 B1
(45) Date of Patent: Nov. 30, 2010

(54) METHOD AND APPARATUS FOR SEPARATION OF CONTROL AND DATA PACKETS

(75) Inventor: Pankaj K. Jha, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1226 days.

(21) Appl. No.: 10/325,555

(22) Filed: Dec. 18, 2002

(51) Int. Cl.
*H04L 12/28* (2006.01)

(52) U.S. Cl. .................. 370/392; 370/419; 370/522

(58) Field of Classification Search ........... 370/392, 370/419, 522
See application file for complete search history.

(56) References Cited

U.S. PATENT DOCUMENTS

| | | | |
|---|---|---|---|
| 4,433,378 A * | 2/1984 | Leger .................. | 710/100 |
| 4,841,526 A * | 6/1989 | Wilson et al. ........... | 714/748 |
| 4,920,483 A | 4/1990 | Pogue et al. | |
| 4,965,794 A | 10/1990 | Smith | |
| 5,079,693 A | 1/1992 | Miller | |
| 5,182,651 A | 1/1993 | Kishi | |
| 5,291,586 A | 3/1994 | Jen et al. | |
| 5,319,648 A * | 6/1994 | Bux et al. ............... | 714/748 |
| 5,386,412 A * | 1/1995 | Park et al. ............... | 370/270 |
| 5,471,628 A | 11/1995 | Phillips et al. | |
| 5,825,770 A | 10/1998 | Coady et al. | |
| 5,844,923 A | 12/1998 | Condon | |
| 5,920,572 A | 7/1999 | Washington et al. | |
| 5,930,830 A | 7/1999 | Mendelson et al. | |
| 5,964,835 A | 10/1999 | Fowler et al. | |
| 6,144,574 A | 11/2000 | Kobayashi et al. | |
| 6,347,097 B1 | 2/2002 | Deng | |
| 6,359,911 B1 | 3/2002 | Movshovich et al. | |
| 6,442,669 B2 | 8/2002 | Wright et al. | |
| 6,584,584 B1 | 6/2003 | Smith | |
| 6,640,297 B1 | 10/2003 | Banning et al. | |
| 6,654,383 B2 * | 11/2003 | Haymes et al. .......... | 370/466 |
| 6,714,543 B1 | 3/2004 | Brueckheimer et al. | |
| 6,741,594 B1 | 5/2004 | Tzeng et al. | |
| 6,763,390 B1 | 7/2004 | Kovacevic et al. | |
| 6,957,309 B1 | 10/2005 | Gupta et al. | |
| 6,961,348 B2 | 11/2005 | Yu | |
| 7,035,335 B1 | 4/2006 | Iacobelli et al. | |
| 7,061,930 B2 | 6/2006 | Mizobata | |
| 7,069,407 B1 | 6/2006 | Vasudevan et al. | |
| 7,073,019 B2 | 7/2006 | Banerjee et al. | |
| 7,088,732 B2 | 8/2006 | Min | |
| 7,324,562 B1 | 1/2008 | Shankar et al. | |
| 7,400,620 B1 | 7/2008 | Verma | |
| 7,420,975 B1 | 9/2008 | Vasudevan | |

(Continued)

OTHER PUBLICATIONS

Eddie Kohler, Robert Morris, Benjie Chen, "Programming Language Optimizations for Modular Router Configurations" ACM SIGOPS Operating Systems Review, vol. 36, 30, 37, Issue, 5, 5, 10, Oct. 2002.

(Continued)

*Primary Examiner*—Jayanti K Patel
*Assistant Examiner*—Bo Hui A Zhu (57) ABSTRACT

In one embodiment, the invention is an apparatus. The apparatus includes a framer to receive packets, to determine a type associated with received packets, to pass data packets to a network processor, and to pass control packets to a host processor. The apparatus also includes a processor coupled to the framer to control the framer.

18 Claims, 7 Drawing Sheets

U.S. PATENT DOCUMENTS

| | | | |
|---|---|---|---|
| 7,493,392 | B1 | 2/2009 | Ganagadharan et al. |
| 2001/0008564 | A1 | 7/2001 | Hirao et al. |
| 2001/0049726 | A1* | 12/2001 | Comeau et al. ............ 709/218 |
| 2002/0009100 | A1 | 1/2002 | Raghavan |
| 2003/0120664 | A1 | 6/2003 | Davidson et al. |
| 2003/0169735 | A1 | 9/2003 | Johnson et al. |
| 2004/0064589 | A1* | 4/2004 | Boucher et al. ............ 709/250 |
| 2004/0117584 | A1 | 6/2004 | Banerjee et al. |
| 2004/0196847 | A1 | 10/2004 | Kuwabara |

OTHER PUBLICATIONS

Imrish Chlamtac et al., "Scalable WDM Access Network Architecture Based On Photonic Slot Routing" IEEE/ACM Transactions on Networking (TON), vol. 7, Issue 1, pp. 1-9, Feb. 1999.

Finney et al. "Using a Common Barrel Shifter for operand normalization, operand alignment and operand unpack & pack in floating point", IBM TDB vol. 29 No. 2 Jul. 1986.

Nilam Ruparelia, "Delivering Ethernet Over Sonet Using Virtual Concatenation," CommsDesign, Feb. 25, 2002, 8 pages, www.comsdesign.com/story/OEG20020225S0078.

Louis E. Frenzel, "Programmable Framer Chip Improves OC-48 Efficiency," Electronic Design, Apr. 16, 2001, 4 pages.

Michael Timothy Moore, Filling the WAN-Communications-Line Card, designfeature, Apr. 18, 2002, 5 pages, www.ednmag.com.

U.S. Appl. No. 10/324,308, Notice of Allowance mailed May 6, 2006, 6 pages.

U.S. Appl. No. 10/317,874, Notice of Allowance mailed Feb. 14, 2006, 5 pages.

U.S. Appl. No. 10/327,456, Notice of Allowance mailed Feb. 23, 2006, 9 pages.

U.S. Appl. No. 10/327,250, Notice of Allowance mailed Sep. 11, 2007, 9 pages.

U.S. Appl. No. 10/327,524, Notice of Allowance mailed May 2, 2008, 12 pages.

U.S. Appl. No. 10/325,415 Notice of Allowance mailed Feb. 6, 2008, 7 pages.

U.S. Appl. No. 10/327,232, Notice of Allowance mailed Jul. 29, 2008, 6 pages.

SearchNetworking.com Definitions, "Frame," printed on Feb. 13, 2008; 3 pages.

USPTO Non-Final Rejection for U.S. Appl. No. 10/327,456 dated Nov. 15, 2005; 9 pages.

USPTO Miscellaneous Action for U.S. Appl. No. 10/327,456 dated Feb. 11, 2003; 1 page.

USPTO Non-Final Rejection for U.S. Appl. No. 10/327,524 dated Nov. 2, 2007; 10 pages.

USPTO Non-Final Rejection for U.S. Appl. No. 10/327,524 dated Jan. 11, 2007; 10 pages.

USPTO Notice of Allowance for U.S. Appl. No. 10/327,250 dated Oct. 18, 2007; 2 pages.

USPTO Non-Final Rejection for U.S. Appl. No. 10/327,250 dated Apr. 12, 2007; 5 pages.

USPTO Requirement for Restriction/Election for U.S. Appl. No. 10/327,250 dated Jan. 4, 2007; 5 pages.

USPTO Notice of Allowance for U.S. Appl. No. 10/327,232 dated Oct. 31, 2008. 10 pages.

USPTO Non-Final Rejection for U.S. Appl. No. 10/327,232 dated Jan. 11, 2008; 19 pages.

USPTO Final Rejection or U.S. Appl. No. 10/327,232 dated Aug. 21, 2007; 15 pages.

USPTO Non-Final Rejection for U.S. Appl. No. 10/327,232 dated Mar. 22, 2007. 14 pages.

USPTO Final Rejection for U.S. Appl. No. 10/327,232 dated Dec. 4, 2006; 12 pages.

USPTO Non-Final Rejection for U.S. Appl. No. 10/327,232 dated Jun. 20, 2006; 10 pages.

USPTO Non-Final Rejection for U.S. Appl. No. 10/324,308 dated Jan. 24, 2005: 7 pages.

USPTO Miscellaneous Action for U.S. Appl. No. 10/324,308 dated Feb. 6, 2003; 1 page.

USPTO Advisory Action for U.S. Appl. No. 10/317,874 dated Jan. 19, 2006; 3 pages.

USPTO Final Rejection for U.S. Appl. No. 10/317,874 dated Nov. 2, 2005; 8 pages.

USPTO Non-Final Rejection for U.S. Appl. No. 10/317,874 dated May 17, 2005; 6 pages.

USPTO Miscellaneous Action for U.S. Appl. No. 10/317,874 dated Nov. 29, 2003, 1 page.

USPTO Final Rejection for U.S. Appl. No. 10/325,415 dated Dec. 12, 2007; 12 pages.

USPTO Non-Final Rejection for U.S. Appl. No. 10/325,415 dated Jun. 27, 2007; 9 pages.

* cited by examiner

METHOD AND APPARATUS FOR SEPARATION OF CONTROL AND DATA PACKETS

FIELD

The invention generally relates to methods and apparatuses used in communications and more specifically to methods and hardware for communications over long-range networks.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor. In particular, this may include taking data bits of a series of bytes and reorganizing them into a form including only data bits. A similar problem may occur at a byte-level, wherein some bytes of a group of bytes are data bytes, and other bytes are effectively control bytes which need to be parsed out of data.

The packets utilized in networks typically have one of two (control and data) forms. Control packets contain information indicating how the network is behaving or how a device within the network should behave. Data packets contain data which is being transmitted across the network. Typically, control packets and data packets are handled differently, in that control packets must be parsed to determine if the receiving system needs to change its operation, whereas data packets must be parsed to extract the transferred data. As these control and data packets are handled differently, they are often handled by different parts of a system.

Figure 1:
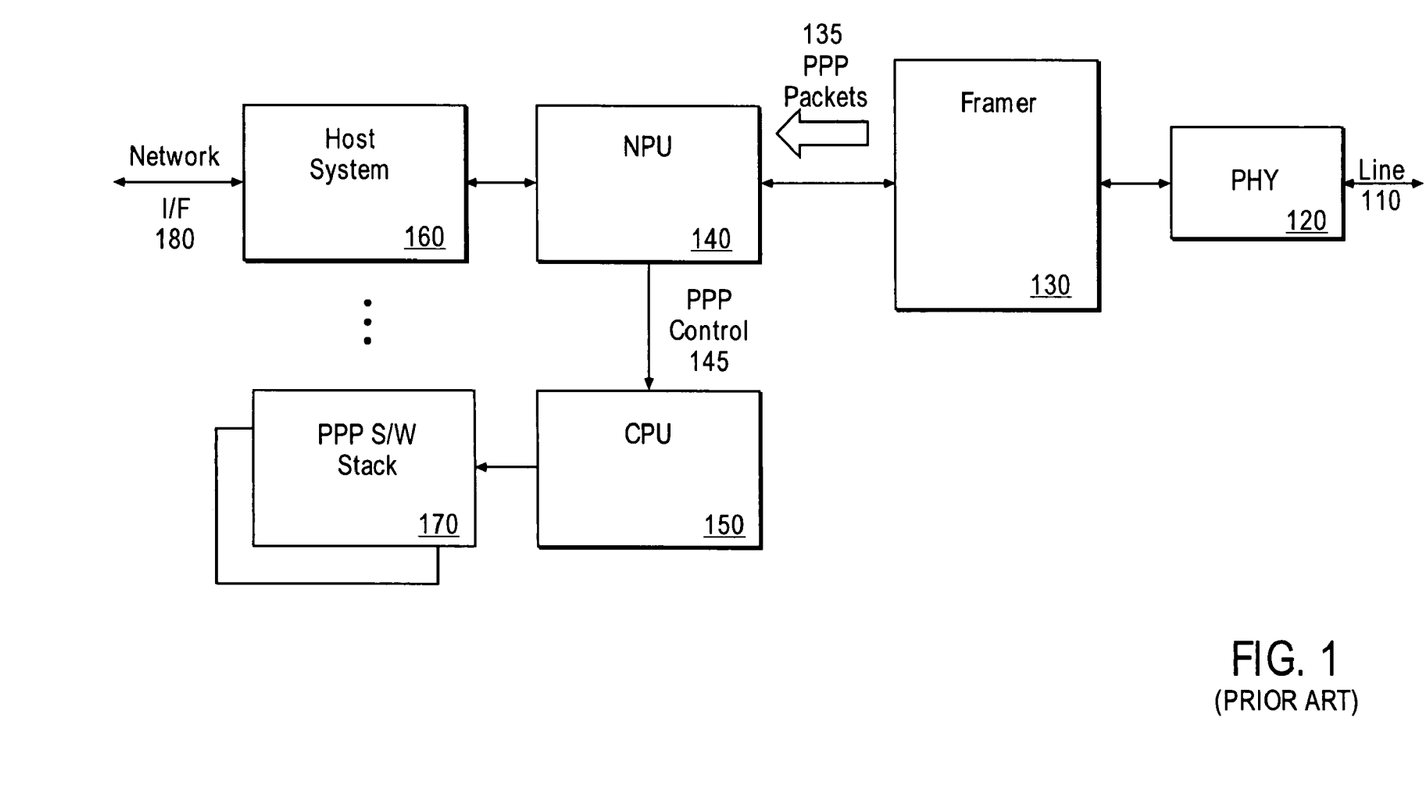
FIG. 1 illustrates an embodiment of a conventional system which uses data and control packets in block diagram form.

FIG. 1 illustrates an embodiment of a conventional system which uses data and control packets in block diagram form. Data is received and sent on line 110, which may be a fiber optic cable for example. Coupled to line 110 is physical layer 120, which translates signals from line 110 into a form suitable for use by circuitry, such as through optoelectronic transformation. Coupled to physical layer 120 is framer 130, which operates to frame or deframe data for transmission or reception. Coupled to framer 130 is network processor 140, which may be used to process data for transmission or reception, and which receives PPP (point-to-point protocol) packets 135 from framer 130. Coupled to network processor 140 is host system 160, which may transfer data between network processor 140 and a network interface 180 which couples to an internal network. Also coupled to network processor 140 is central processor 150.

Network processor 140 separates out PPP control packets 145 from data packets in PPP packets 135, and provides PPP control packets 145 to central processor 150. Central processor 150 then provides PPP control packets to host system 160 through PPP software stack 170, which may be a software stack in memory accessible by both central processor 150 and the rest of host system 160. The data packets of PPP packets 135 are handled by network processor 140 and processed therein, with the data typically provided to host system 160.

Figure 2:
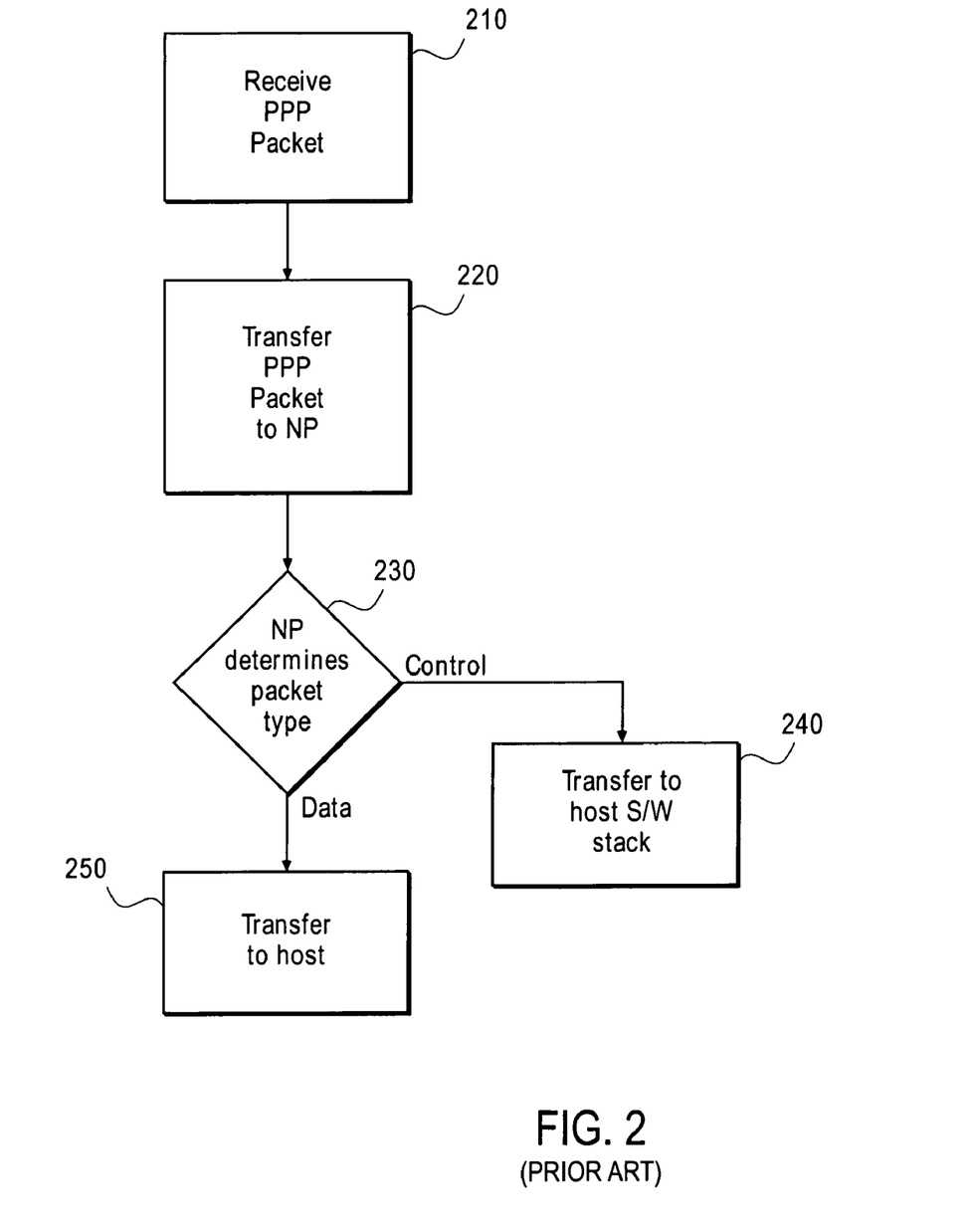
FIG. 2 illustrates an embodiment of a conventional method of handling data and control packets in flow diagram form.

The relevant aspects of the operations of the system of FIG. 1 are illustrated in FIG. 2. FIG. 2 illustrates an embodiment of a conventional method of handling data and control packets in flow diagram form. At block 210, a PPP packet is received. At block 220, the PPP packet is transferred from the framer (such as framer 130 for example) to the network processor (such as network processor 140 for example). At block 230, the network processor determines what type of packet it has received. If it is a control packet, the process turns to block 240, and the control packet is transferred to the host software stack (such as software stack 170 for example), for handling by the host system (such as host system 160 for example). If the packet received at block 210 is a data packet, at block 250, the data of the data packet is provided to the host system by the network processor, after processing by the network processor.

Thus, the network processor uses its resources to determine whether the packets received through a network line, and passed through a physical link layer and a framer, are either data or control packets. If half of the packets received are control packets, this means that the network processor uses its resources on a fruitless comparison on the other half of the packets received (the data packets). However, in practical terms, a well-functioning network will have many more data packets than control packets in transit at a given time, so the fruitless comparison is performed on the vast majority of the packets.

SUMMARY

In one embodiment, the invention is a method. The method includes receiving PPP (Point-to-Point Protocol) packets within a framer. The method also includes providing PPP data packets from the framer to a network processor. The method further includes providing PPP control packets from the framer to a host processor.

In an alternate embodiment, the invention is an apparatus. The apparatus includes a framer to receive packets, to determine a type associated with received packets, to pass data packets to a network processor, and to pass control packets to a host processor. The apparatus also includes a processor coupled to the framer to control the framer.

In another alternate embodiment, the invention is an apparatus. The apparatus includes means for receiving PPP (Point-to-Point Protocol) packets. The apparatus also includes means for providing PPP data packets to a network processor. The apparatus further includes means for providing PPP control packets to a host processor.

BRIEF DESCRIPTION OF THE DRAWINGS

The present invention is illustrated by way of example and not limitation in the accompanying figures.

DETAILED DESCRIPTION

A method and apparatus for separation of control and data packets is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the invention involves use of logic or other apparatus within a framer to find data and control packets within a data stream, and direct those data and control packets to appropriate destinations. In doing so, this avoids requiring the network processor to use its processing resources to accomplish the same task, and thereby allows the network processor to simply process data. This potentially allows for simpler designs for a network processor, and similarly allows for more efficient utilization of the network processor.

As most packets received from a network are data packets, the network processor typically has plenty of work to expend its resources on processing data packets. Thus, alleviating the additional burden on the network processor of detecting control packets may be advantageous. Furthermore, as the network processor does not typically do anything with or to control packets, speeding control packets to their destination from an earlier point in the system may also be advantageous.

In one embodiment, the invention is a method. The method includes receiving PPP (Point-to-Point Protocol) packets within a framer. The method also includes providing PPP data packets from the framer to a network processor. The method further includes providing PPP control packets from the framer to a host processor.

The method may further include determining whether PPP packets are data packets or control packets within the framer. The method may also include disabling the network processor responsive to a PPP control packet. The method may further include enabling the network processor responsive to a PPP data packet. The method may also include programming a set of PPP control codes, with the framer using the PPP control codes for comparison with a portion of each PPP packet.

In an alternate embodiment, the invention is an apparatus. The apparatus includes a framer to receive packets, to determine a type associated with received packets, to pass data packets to a network processor, and to pass control packets to a host processor. The apparatus also includes a processor coupled to the framer to control the framer.

The apparatus may also include a network processor coupled to the framer and the processor, with the network processor controlled by the processor. The network processor is to process data packets. The apparatus may further include a line interface coupled to the framer. The apparatus may also include a host system interface coupled to the network processor. The apparatus may further include a host processor interface coupled to the framer. The apparatus may also include a PPP control codes set of storage locations suitable for storage of the PPP control codes, which may be accessed by the comparison logic to obtain the PPP control codes as the predetermined values.

In another alternate embodiment, the invention is an apparatus. The apparatus includes means for receiving PPP (Point-to-Point Protocol) packets. The apparatus also includes means for providing PPP data packets to a network processor. The apparatus further includes means for providing PPP control packets to a host processor.

Figure 3:
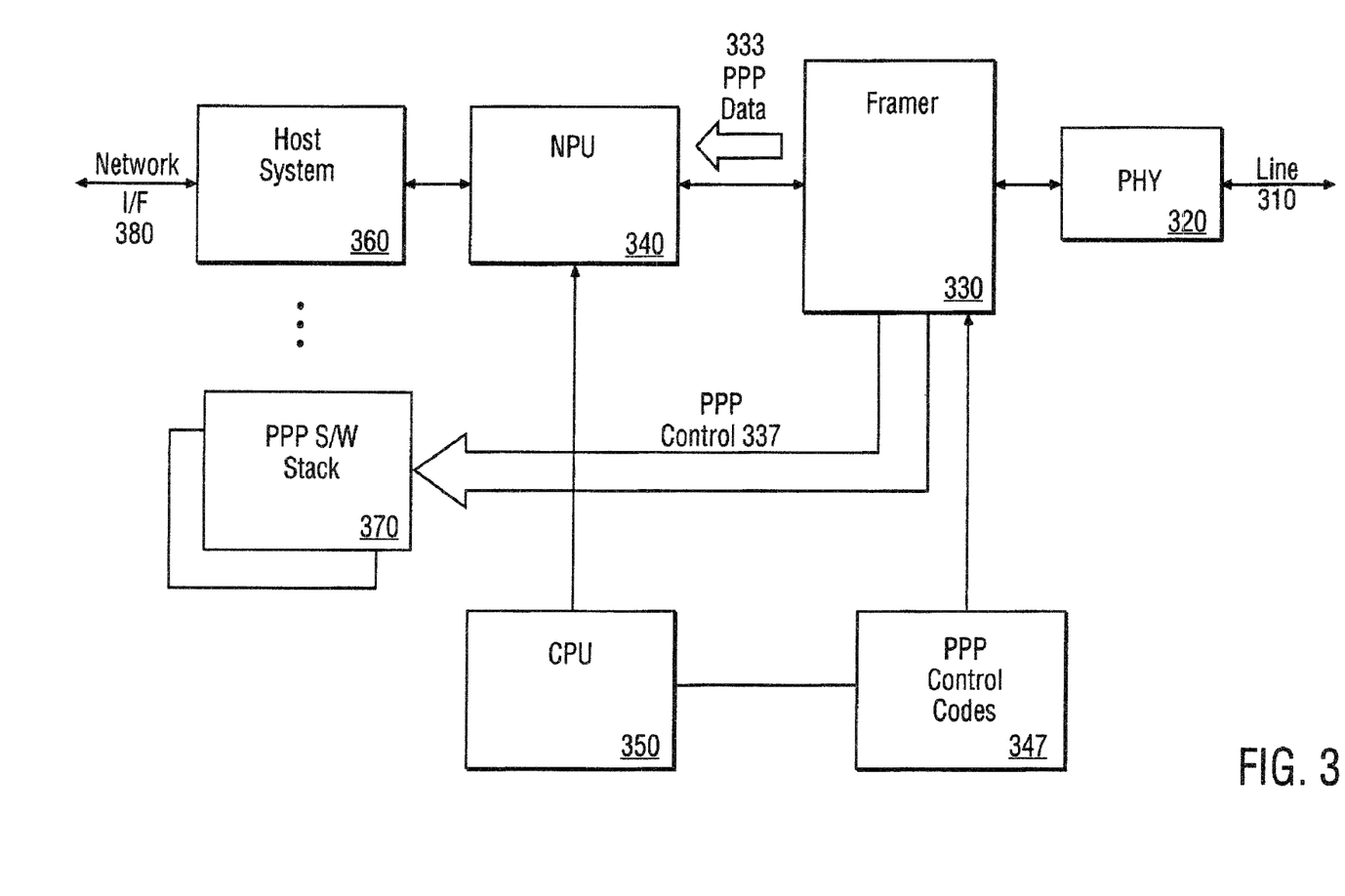
FIG. 3 illustrates an embodiment of a system which may use data and control packets in block diagram form.

FIG. 3 illustrates an embodiment of a system which may use data and control packets in block diagram form. Data is received and sent on line 310, which may be a fiber optic cable or copper-wire cable for example. Coupled to line 310 is physical layer 320, which translates signals from line 310 into a form suitable for use by circuitry, such as through optoelectronic transformation or level-shifting for example. Coupled to physical layer 320 is framer 330, which operates to frame or deframe data for transmission or reception, and which parses the PPP packets to determine which are data and which are control packets. Coupled to framer 330 is network processor 340, which may be used to process data for transmission or reception, and which receives data packets 333 from framer 330. Coupled to network processor 340 is host system 360, which may transfer data between network processor 340 and a network interface 380 which couples to an internal network. Also coupled to network processor 340 and to framer 330 is central processor 350.

Framer 330 separates out PPP control packets 337 from PPP data packets 333. Framer 330 provides PPP control packets 337 to host system 360 through PPP software stack 370, which may be a software stack in memory accessible by both framer 330 and the rest of host system 360. The data packets 333 are handled by network processor 340 and processed therein, with the data typically provided to host system 360. Central processor 350 controls the activities of framer 330 and network processor 340. Central processor 350 may control through such actions as programming the PPP control codes 347 used by framer 330 to recognize control packets, enabling/disabling framer 330 and enabling/disabling network processor 340.

Figure 4:
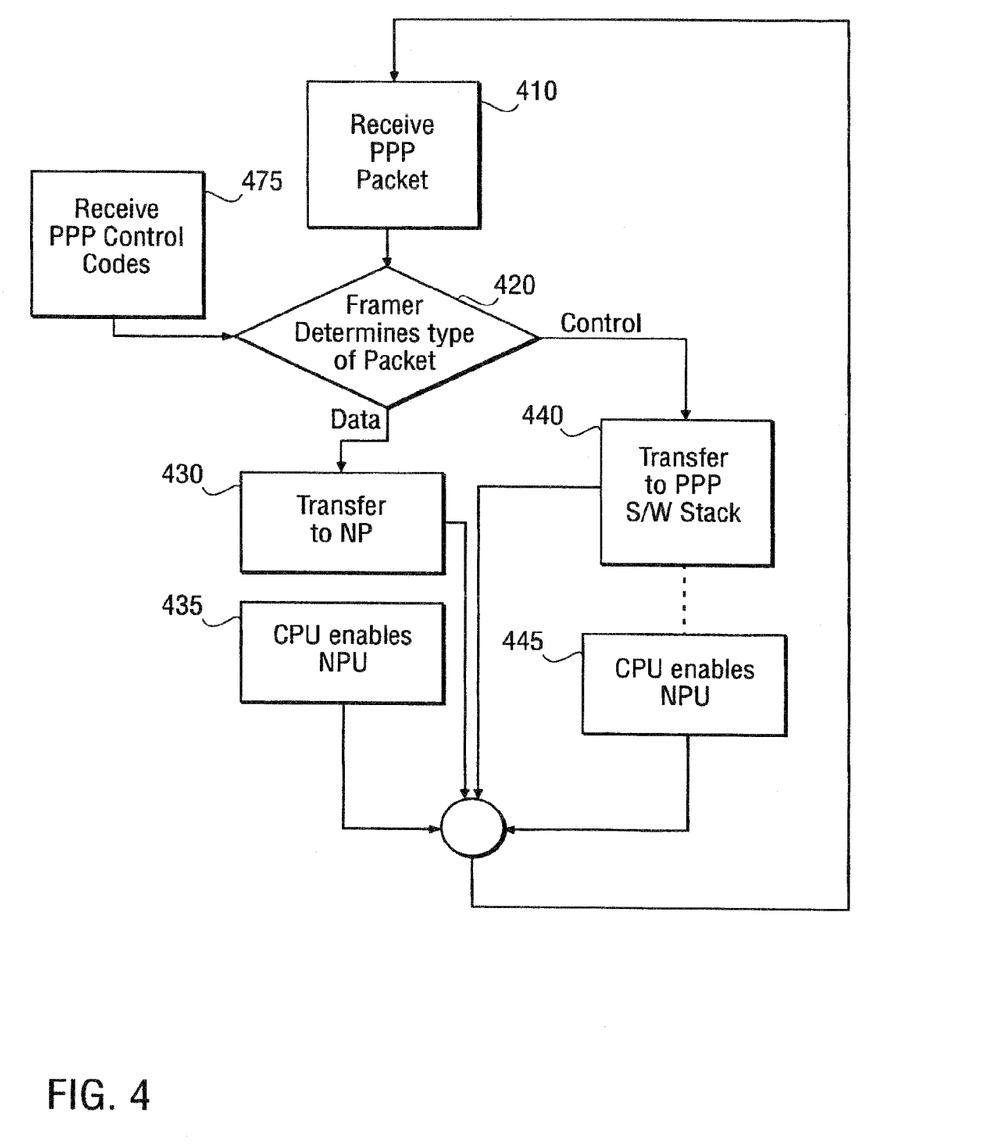
FIG. 4 illustrates an embodiment of a method of handling data and control packets in flow diagram form.

Exactly how the circuitry of FIG. 3 operates may be implementation- and embodiment-dependent. However, a general method of handling data and control packets may be illustrative. FIG. 4 illustrates an embodiment of a method of handling data and control packets in flow diagram form. At block 410, a PPP packet is received. At block 420, the framer (such as framer 330 for example) determines what type of packet is present, potentially based in part on reception of current or updated PPP control codes at block 475.

If the packet is a control packet, at block 440, the control packet is transferred to a software stack (such as software stack 370 for example). Potentially, depending on implementations, the process proceeds to block 410, or first proceeds to block 445, where a central (control) processor (such as central processor 350 for example) disables the network processor (such as network processor 340 for example) and then proceeds to block 410. If the packet at block 420 is a data packet, then at block 430 the data packet is transferred to the network processor. The process then either proceeds to block 410, or at block 435 the central processor enables the network processor, and the process then proceeds to block 410.

The process may be repeated as many times as a packet is received. Furthermore, the optional enabling and disabling of the network processor may be included or excluded either on a permanent basis, or on a packet-by-packet basis, depending on the implementation of the method. Similarly, the PPP control codes used to determine whether a packet is a control packet or not (and thus a data packet) may be supplied in a variety of ways. In some embodiments, they are available in memory or registers, in alternate embodiments, they are hard-wired, for example.

Figure 5:
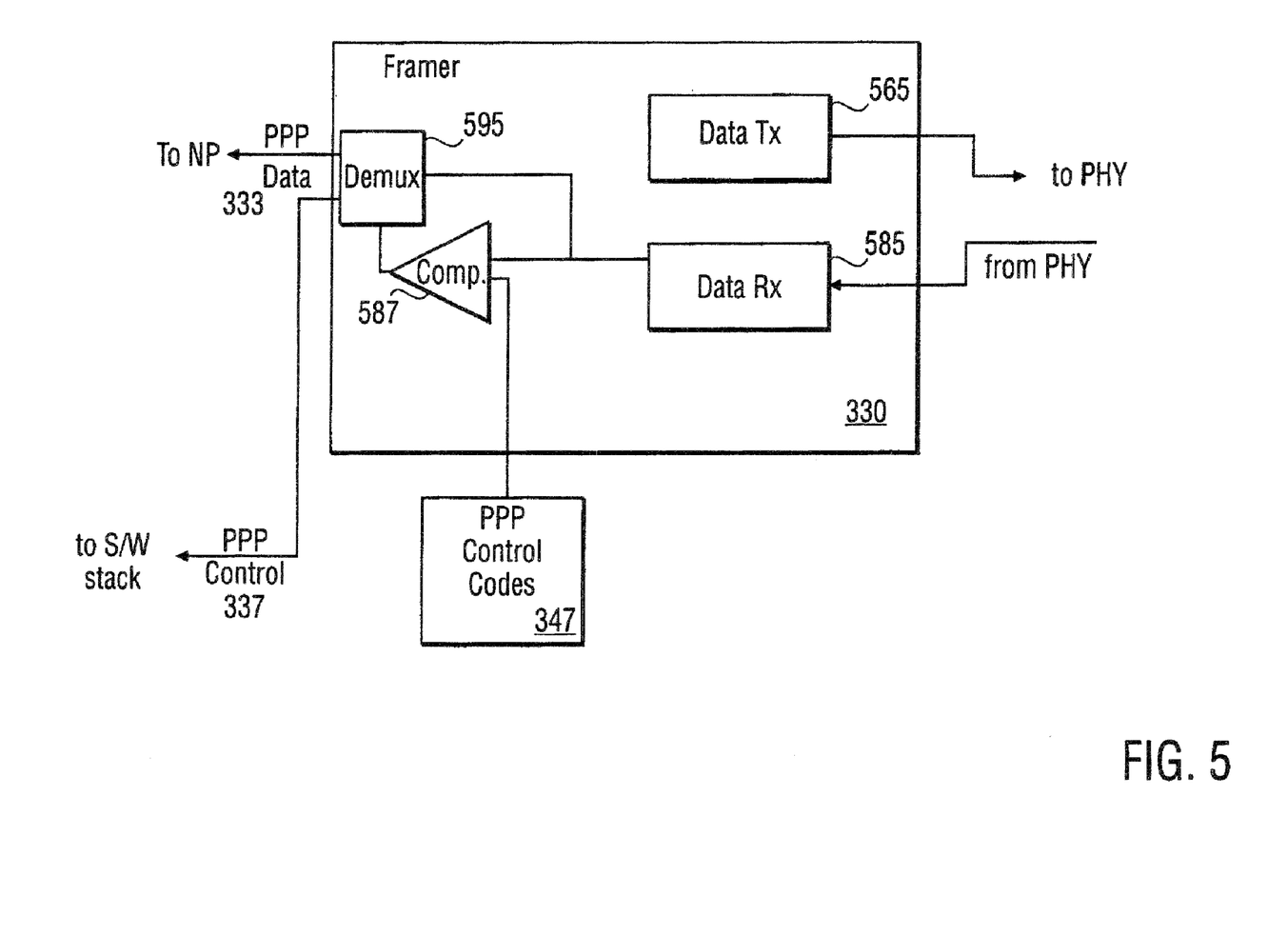
FIG. 5 illustrates an embodiment of portions of a framer which may handle data and control packets in block diagram form.

In the case of either implementing the method of FIG. 4 or providing the system of FIG. 3, it is preferable that a framer be provided which can determine which packets are control packets and which packets are data packets. FIG. 5 illustrates an embodiment of portions of a framer which may handle data and control packets in block diagram form. Framer 330 is one embodiment of a framer suitable for use in the system of FIG. 3, but other embodiments may be similarly suitable. Data transmit logic 565 provides packets to an associated physical link layer, and may be implemented as it would be implemented in other framers. Data receive logic 585 receives PPP data from the associated physical link layer, and provides that data both to comparison logic 587 (a comparator for example) and to demultiplexer 595. Comparator 587 utilizes PPP control codes 347 (a separate component from framer 330) to determine whether the received packet is a data packet or a control packet. Based on this comparison, comparator 587 provides an output value to demultiplexer 595, thereby selecting either an associated network processor (or similar device) or an associated software stack (or similar destination) for the received packet. The demultiplexer 595 actually provides as an output either PPP data 333 or PPP control 337 at any given time. In some embodiments, demultiplexer 595 may be synchronous in nature, allowing for a comparison to be performed and then an output selected on every clock cycle for example.

Figure 6:
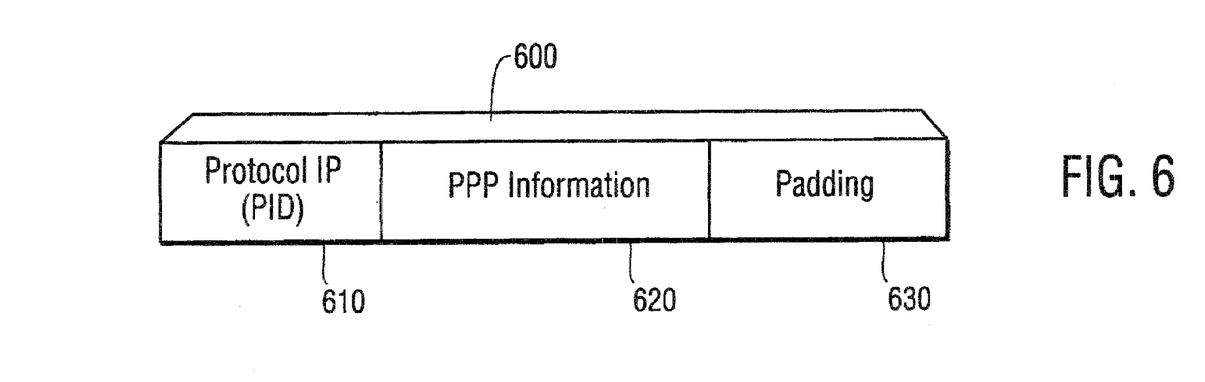
FIG. 6 illustrates an embodiment of a packet.

The packets discussed previously come in potentially two different forms. FIG. 6 illustrates an embodiment of a packet. Packet 600 includes three distinct portions. Protocol ID 610 indicates very basic information about the type of packet, and may be used to determine a destination for the packet. PPP information 620 is the actual information or payload of the packet. Padding 630 is extra bytes included to make sure the packet 600 is of the correct or of a sufficient length, and these bytes typically will be discarded prior to use of the PPP information 620.

Figure 7:
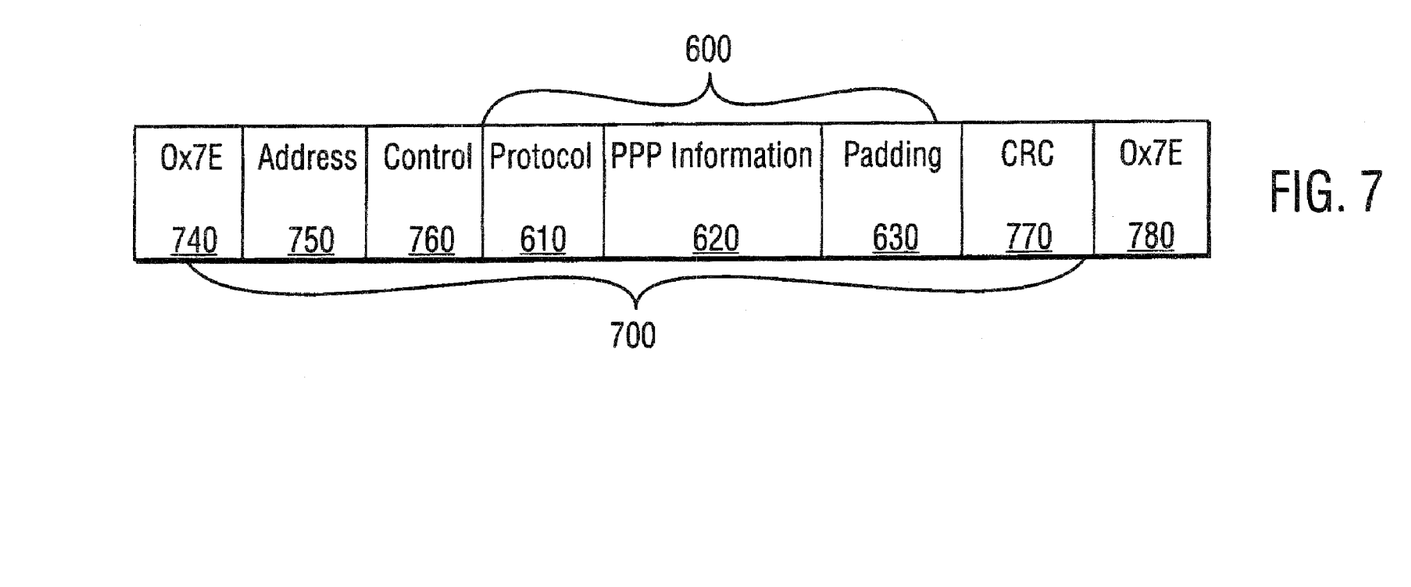
FIG. 7 illustrates an alternate embodiment of a packet.

FIG. 7 illustrates an alternate embodiment of a packet. Packet 700 includes packet 600, along with additional information. The additional information includes delimeters 740 and 780, each of which have the value 0x7E in one embodiment. Delimiter 740 indicates the beginning of packet 700 and delimiter 780 indicates the end of packet 700. Address 750 indicates what the destination of packet 700 is, although this address may specify a system or some other form of destination within a network, rather than a location within a system for example. Control field 760 is, in one embodiment, a user defined field which indicates whether a packet is a control or data packet, and potentially what type of control packet. CRC 770 is a cyclic redundancy check field, including a checksum in some embodiments, and is used for error checking. In one embodiment, control field 760 may be interpreted using the following table:

| PID | Protocol | Comments |
| --- | --- | --- |
| 0xxx-3xxx | Network Layer (NL) protocols | Traffic such as IP |
| 4xxx-7xxx | Low-volume traffic packets | |
| 8xxx-Bxxx | NCP for different Network Layer (NL) | Traffic for which protocol ID is not available |
| Cxxx-Fxxx | Link Layer Protocols. C021: LCP C023: PAP C223: CHAP, etc. | |

In some embodiments, the packet 700 is transferred over a network, potentially along a line, such as line 310 for example, and through a physical link layer, such as link layer 320 for example, to a framer, such as framer 330 for example. At framer 330, in some embodiments, a determination is made as to whether packet 700 is a control or data packet by examining control field 760, and comparing control field 760 with known control codes (such as those available from PPP control codes 347 for example). Other activities may include performing a CRC error check operation, unscrambling a packet, and determining what size the packet is (small packets may require special handling for example). In one embodiment, the packet 600 is extracted from packet 700 and provided to an appropriate destination, either network processor 340 for a data packet or software stack 370 for a control packet.

Packet 700 may similarly be transferred over line 110, through physical link layer 120 and to framer 130. As framer 130 is not known to have any capability to determine the nature of the packet 700, it will likely pass all of packet 700 to network processor 140, where packet 700 may be examined. In the case of a short control packet, all of the data of packet 700 must be passed along the bus to network processor 140, even if network processor 140 will simply extract packet 600 and pass that to the host system for its use. Thus, this requires use of both bandwidth and processing resources within and around network processor 140 which need not be required in the embodiment illustrated with respect to FIG. 3.

Figure 8:
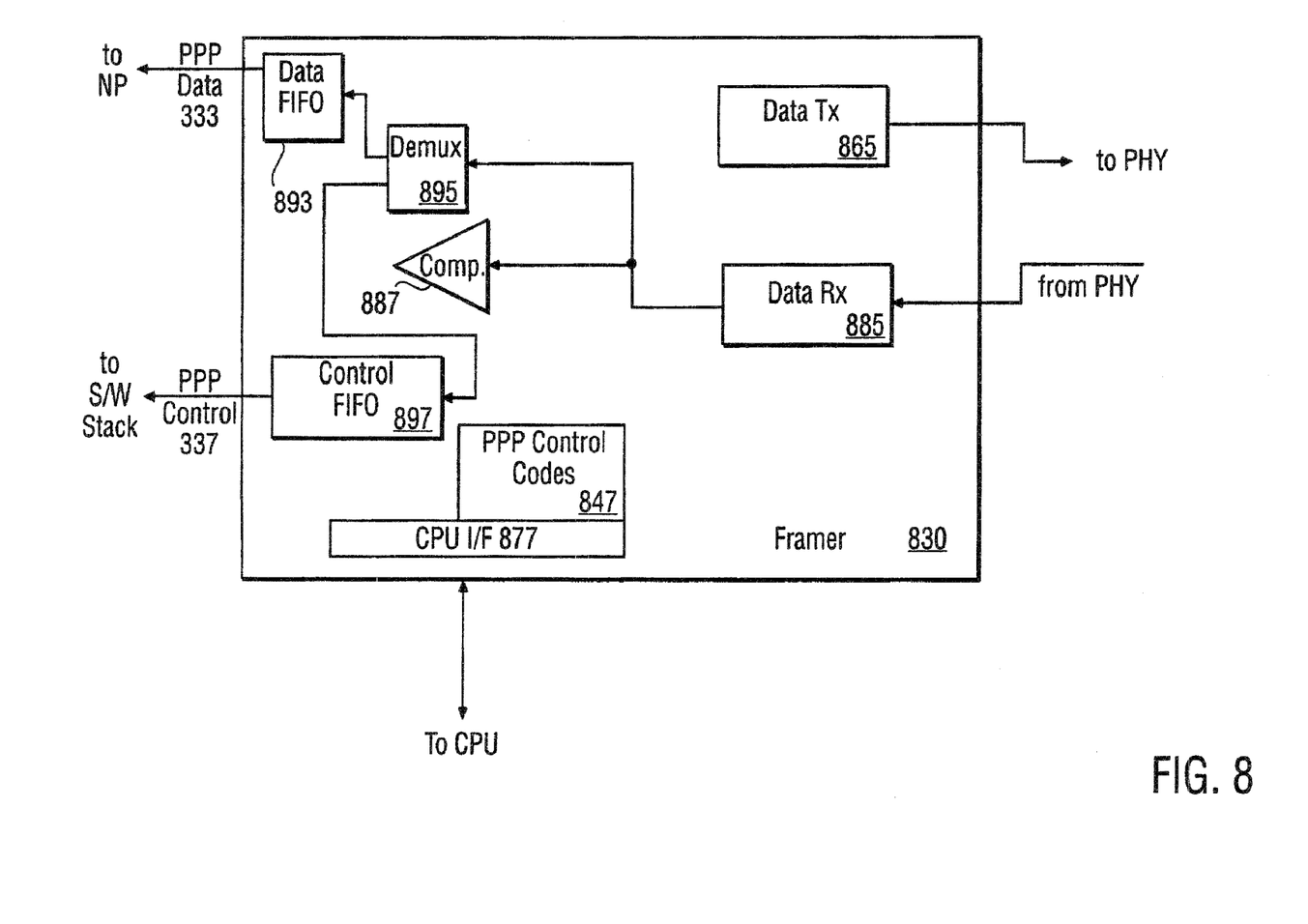
FIG. 8 illustrates an alternate embodiment of portions of a framer which may handle data and control packets in block diagram form.

While the packets of FIGS. 6 and 7 have been described as they might interact with framer 340, various implementations of a framer may be used within the spirit and scope of the present invention. FIG. 8 illustrates an alternate embodiment of portions of a framer which may handle data and control packets in block diagram form. Data transmit logic 865 provides packets to an associated physical link layer, and may be implemented as it would be implemented in other framers. Data receive logic 885 receives PPP packets from the associated physical link layer, and provides that data both to comparison logic 887 (a comparator for example) and to demultiplexer 895. Comparison logic 887 utilizes PPP control codes 847 (integrated into framer 830) to determine whether the received packet is a data packet or a control packet. Based on this comparison, comparison logic 887 provides an output value to demultiplexer 895, thereby selecting either an associated network processor (or similar device) or an associated software stack (or similar destination) for the received packet. The demultiplexer 895 actually provides data to one of data packet FIFO 893 or control packet FIFO 897, each of which serve as interfaces with the rest of the system. Data packet FIFO 893 provides PPP data 333 to an associated network processor or other destination. Control packet FIFO 897 provides PPP control 337 to an associated software stack or other destination.

Preferably, the PPP control codes 847 are implemented in a modifiable fashion. CPU interface 877 provides for an interface between framer 830 and an associated processor, preferably allowing for programming (initializing and/or altering for example) of the PPP control codes 847 within framer 830. Moreover CPU interface 877 may provide for control or other communication between an associated processor and framer 830.

Note that various connections are illustrated with respect to FIG. 8, and similarly with respect to FIGS. 3 and 5 for example. These connections may actually represent coupling between the elements illustrated, rather than a direct connection.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 8 may be integrated into components, or may be subdivided into components. Similarly, the blocks of FIG. 4 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method, comprising:
   receiving a PPP (Point-to-Point Protocol) packet at a framer;
   determining, within the framer, whether the received PPP packet is a data packet or a control packet;
   sending the received PPP packet along a bus from the framer to a network processor when the received packet is determined to be the data packet, wherein the framer is connected to the network processor through the bus, and wherein the network processor processes data from the data packet; and
   sending the received PPP packet from the framer through a software stack directly to a host processor bypassing the bus and the network processor when the received packet is determined to be the control packet, wherein the host processor is separate from the framer.

2. The method of claim 1, further comprising:
   disabling the network processor responsive to a PPP control packet.

3. The method of claim 2, further comprising:
   enabling the network processor responsive to a PPP data packet.

4. The method of claim 3, further comprising:
   programming a set of PPP control codes, the framer using the PPP control codes for comparison with a portion of each PPP packet.

5. The method of claim 4, wherein:
   the PPP control codes are stored in memory locations within the framer.

6. The method of claim 4, wherein:
   the PPP control codes are stored in memory locations in a component separate from the framer.

7. An apparatus, comprising:
   means for receiving a PPP (Point-to-Point Protocol) packet at a framer;
   means for determining, within the framer, whether the PPP packet is a PPP data packet or a PPP control packet;
   means for sending the received PPP packet along a bus to a network processor when the received PPP packet is determined to be the PPP data packet, wherein the network processor processes data from the data packet, and wherein the framer is connected to the network processor through the bus; and
   means for sending the received PPP packet from the framer through a software stack directly to a host processor bypassing the bus and the network processor when the received PPP packet is determined to be PPP control packet, wherein the host processor is separate from the framer.

8. The apparatus of claim 7, further comprising:
   means for disabling the network processor responsive to a PPP control packet.

9. The apparatus of claim 7, further comprising:
   means for enabling the network processor responsive to a PPP data packet.

10. A framer, comprising:
    data receive logic to receive a packet from a physical layer;
    comparison logic coupled to the physical layer; and
    selection logic coupled to the data receive logic and the comparison logic, wherein the comparison logic is configured to determine whether the received packet is a data packet or a control packet, wherein based on the determination of the comparison logic, the comparison logic provides an output value to the selection logic to select either a network processor or a host processor to send the received packet, wherein the selection logic is configured to output the received packet along a bus to the network processor when the received packet is determined to be the data packet, wherein the network processor processes data from the data packet, wherein the framer is connected to the network processor through the bus, and wherein the selection logic is configured to output the received packet through a software stack directly to the host processor bypassing the bus and the network processor when the received packet is determined to be the control packet, wherein the host processor is separate from the selection logic.

11. The framer of claim 10, wherein the comparison logic is configured to compare whether a portion of the received packet matches a set of predetermined values, with a match indicating a control packet type and no match indicating a data packet type.

12. The framer of claim 11, further comprising a set of storage locations that store the set of predetermined values.

13. The framer of claim 11, further comprising an interface for receiving the set of predetermined values from a component that is coupled to the framer.

14. The framer of claim 10, further comprising:
    a first first-in-first-out (FIFO) memory coupled to the selection logic to receive the data packet, wherein the first FIFO memory is coupled to the network processor; and
    a second first-in-first-out memory coupled to the selection logic to receive the control packet, wherein the second FIFO memory is coupled to the host processor.

15. The framer of claim 14, wherein the second FIFO is configured to pass the control packet to a software stack in a memory of the host processor.

16. The framer of claim 11, further comprising:
a network processor interface to pass the data packet to the network processor, wherein the network processor processes data packets;
a host processor interface to pass the control packet to the host processor; and
a processor interface to receive the set of predetermined values from the processor.

17. The framer of claim 10, wherein the framer is coupled to the processor, and wherein the host processor is configured to enable the network processor responsive to a PPP data packet, and wherein the host processor is configured to disable the network processor responsive to a PPP control packet.

18. The framer of claim 11, further comprising a set of storage locations suitable for storage of PPP control codes, which may be accessed by the comparison logic to obtain the PPP control codes as the set of predetermined values.

\* \* \* \* \*